United States Patent
Burton et al.

(10) Patent No.: US 8,962,512 B1
(45) Date of Patent: Feb. 24, 2015

(54) SYNTHESIS OF PD PARTICLES BY ALCOHOLS-ASSISTED PHOTOREDUCTION FOR USE IN SUPPORTED CATALYSTS

(75) Inventors: Patrick David Burton, Albuquerque, NM (US); Timothy J Boyle, Albuquerque, NM (US); Abhaya Datye, Albuquerque, NM (US)

(73) Assignees: STC.UNM, Albuquerque, NM (US); Sandia Corporation, Albuquerque, NM (US)

( * ) Notice: Subject to any disclaimer, the term of this patent is extended or adjusted under 35 U.S.C. 154(b) by 241 days.

(21) Appl. No.: 13/344,462

(22) Filed: Jan. 5, 2012

Related U.S. Application Data

(60) Provisional application No. 61/460,585, filed on Jan. 5, 2011.

(51) Int. Cl.
*B01J 21/18* (2006.01)
*B01J 23/00* (2006.01)
*B82Y 30/00* (2011.01)
*B01J 23/44* (2006.01)

(52) U.S. Cl.
CPC ............. *B01J 21/18* (2013.01); *B82Y 30/00* (2013.01); *B01J 23/44* (2013.01); *Y10S 977/81* (2013.01)

USPC .......................................... 502/185; 977/810

(58) Field of Classification Search
None
See application file for complete search history.

(56) References Cited

U.S. PATENT DOCUMENTS

| | | | | |
|---|---|---|---|---|
| 5,894,038 A | * | 4/1999 | Sharma et al. | 427/554 |
| 6,709,643 B1 | * | 3/2004 | Ozkan et al. | 423/239.1 |
| 6,923,923 B2 | * | 8/2005 | Cheon et al. | 252/512 |
| 6,984,668 B1 | * | 1/2006 | Eastham et al. | 516/33 |
| 2009/0326288 A1 | * | 12/2009 | Mamadov et al. | 585/259 |
| 2012/0288430 A1 | * | 11/2012 | Bello et al. | 423/247 |

FOREIGN PATENT DOCUMENTS

FR 2850661 A1 * 8/2004

* cited by examiner

*Primary Examiner* — Melissa Swain
(74) *Attorney, Agent, or Firm* — Gonzales Patent Services; Ellen M. Gonzales

(57) ABSTRACT

The present disclosure provides a novel synthesis method for palladium nanoparticles and palladium nanoparticles made using the method. The nanoparticles resulting from the method are highly reactive and, when deposited on a support, are highly suitable for use as catalytic material.

20 Claims, 3 Drawing Sheets

US 8,962,512 B1

SYNTHESIS OF PD PARTICLES BY ALCOHOLS-ASSISTED PHOTOREDUCTION FOR USE IN SUPPORTED CATALYSTS

CROSS-REFERENCE TO RELATED APPLICATIONS

The following application claims benefit of U.S. Provisional Application No. 61/460,585, filed Jan. 5, 2011, which is hereby incorporated by reference in its entirety.

STATEMENT REGARDING GOVERNMENT SPONSORED RESEARCH

This invention was made with Government support under DE-FG02-05ER15712 awarded by the U.S. Department of Energy and DE-AC04-94AL85000 awarded by the U.S. Department of Energy to Sandia Corporation. The U.S. Government has certain rights in this invention.

BACKGROUND

Supported Pd nanoparticles constitute the active phase in catalysts used for energy conversion, chemical synthesis, and pollution abatement. To achieve the highest selectivity and reactivity, it is desirable to have well-dispersed nanoparticles (NPs) that have identical properties and distribution of active sites [1]. Unfortunately, conventional synthesis routes do not provide the requisite degree of control, since they start from Pd salts that are first deposited on a support by impregnation or precipitation. The impregnation method is simple but time-consuming, as it is often necessary to coat the support multiple times. Each time the solvent must be dried before repeating the process, which can take up to several hours per iteration. Once the desired amount of precursor has been coated, the powder is then oxidized and reduced to produce nanoparticles with uncontrolled size and dispersion over the support. The precipitation method begins with the desired salts in an acidic solution and adding a base to precipitate a solid, which is dried, calcined, and reduced. In both the impregnation and precipitation methods, the resulting nanoparticles are generally unevenly dispersed over the support and exhibit a broad size distribution. Furthermore, reduction is achieved by high-temperature treatments involving calcination and $H_2$ reduction, or chemical reduction by sodium borohydride [2]. The resulting broad distribution of particle size, shape, and composition is detrimental to catalyst performance. Hence, there has been considerable interest in developing colloidal routes to synthesize well-defined nanoparticles that could be used to prepare heterogeneous catalysts [3-5]. Typically, solution routes require various reducing agents such as hydrazine [6], alkaline borohydrides, [7], or amine groups [8] where the particles are protected by polymer groups, surfactants or ligands to prevent agglomeration and growth [7,9].

Polymer protecting agents such as poly(vinyl pyrrolidone) (PVP) and polyvinyl alcohol (PVA) allow preparation of metal colloids that can be stable for months with reasonable control over size as well as shape [10-14]. The synthesis involves addition of polymer to the metal salt followed by chemical or thermal reduction to produce a stable black suspension of $Pd^0$ particles. These polymer-capped nanoparticles have been shown to be capable of adsorbing probe molecules (i.e., CO) [12] and to be active in a variety of liquid-phase reactions, such as olefin hydrogenation [3] as well as alcohol oxidation [15]. However, when the polymer-capped nanoparticles are deposited on a support for gas-phase reactions, the capping agent must be removed to achieve catalytic activity [1,16,17]. The high-temperature oxidation and reduction treatments used can lead to particle growth and loss of monodispersity. Therefore, there is a need to develop novel routes that can provide metal nanoparticles without protective polymers or capping ligands.

In solvothermal synthesis, precursors, such as palladium chloride or palladium (bis acetyl acetonate), are added to high boiling solvents such as bromobenzene, toluene, or methyl isobutyl ketone in the presence of a surfactant to achieve reduction of the metal [18]. A more easily reduced precursor, such as palladium acetate (noted as $Pd(OAc)_2$) allows for colloidal synthesis at lower temperature using simple alcohols as reducing agents [4,5,19]. However, literature reports that utilize methanol (MeOH) without a capping agent indicate that large aggregates will form [19]. These aggregates can reach diameters of 50 nm and are not suited for catalytic applications. The uncontrolled reduction in Pd complexes at elevated temperatures has been described in the homogeneous catalysis literature as a nuisance [20]. These studies all suggest that capping agents or ligands are essential for the synthesis of nanoparticles in solution at elevated temperatures.

Recent work by Chen et al [21] has shown that graphene oxide can directly reduce $K_2PdCl_4$ to produce NPs. While this is an effective technique and yields Pd nanoparticles of about 3 nm in diameter, it is limited to reactions using graphene oxide as a support.

SUMMARY

The present disclosure provides a novel synthesis method for palladium nanoparticles and palladium nanoparticles made using the method. The nanoparticles resulting from the method are highly reactive and, when deposited on a support, are highly suitable for use as catalytic material.

DETAILED DESCRIPTION

Figure 1:
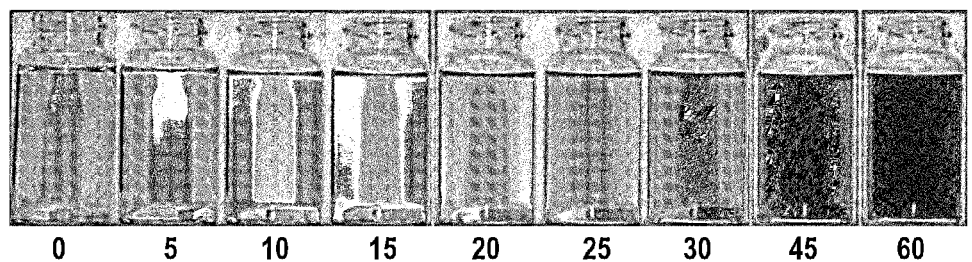
FIG. 1 is a time-progression in minutes of formation of air-exposed Pd NP solution in MeOH.

The present disclosure provides a novel method for synthesizing palladium nanoparticles and nanoparticles synthesized by this method. According to an embodiment of the synthesis method, a palladium precursor is reduced via a mild reducing agent, such as an alcohol, without need for surfactants, capping ligands, or polymers. At a suitable stage during the generation of nanoparticles, the suspension is contacted with a powder support, which may be, for example, carbon, and the product is filtered to separate the support and solution. This synthesis method allows for the simple, direct production of nanoparticles on a support. Furthermore, the resulting nanoparticles do not suffer from interference from organic residues or other catalyst precursors, rendering the nanoparticles of the present disclosure catalytically active in their as-prepared state, making them ideally suited for use as supported catalysts.

According to a first embodiment of the present disclosure, a metal precursor is added to a solvent. In general, the metal precursor should be reducible at the temperature at which the reaction is to be conducted. Accordingly, because the presently disclosed reaction is typically carried out under ambient laboratory temperature conditions (which typically range between 10° and 40° C., more commonly between 15° and 35° C., and most commonly between 20° and 25° C.), suitable metal precursors include those precursors which are reducible under ambient conditions including, for example, carboxylates, acetylacetonates, and cyclooctadienyls. According to a specific example, palladium acetate may be used. Suitable solvents include alcohols such as methanol, ethanol or isopropanol. Current studies indicate that the use of an alcohol/water mixture as the solvent may result in wider variations in particle size and increased reaction time. In general, unlike previously described methodologies the presently disclosed reaction is performed under ambient laboratory conditions, i.e., at "room temperature." However, if desired, the rate of reaction can be controlled by changing temperature with lower temperatures leading to slower reaction. Furthermore, our experiments have shown that light conditions can affect the reaction, with ambient and UV light conditions producing similar results and black box conditions resulting in slower or stalled reactions.

Returning to the method, the metal precursor/solvent mixture is stirred until the precursor is dissolved in the solvent and a solution is obtained. Under various experimental conditions, approximately 5 minutes of stirring was found to yield sufficient results, though those of skill in the art will appreciate that this may vary depending on the particular combination of precursor, solvent, and other laboratory conditions. The reaction is then allowed to progress without stirring until the solution darkens, indicating the formation of a colloidal suspension of metal nanoparticles. Under various experimental conditions, the solution progressively darkened first to an olive green and then eventually to black. The amount of time to achieve the black solution varied according to experimental conditions, with anhydrous conditions being found to produce the fastest color change. The particles can then be removed from the solution by evaporation, filtration, or any other suitable known methods. The above-described method produces a mean particle diameter of approximately 1.5 nm in as little as 20 minutes without the need for the capping agents or elevated temperatures that can limit the uses of the resulting particles. It will be appreciated that the mean particle size of the resulting particles can be altered by varying experimental parameters such as the solvent, the reaction temperature, the metal precursor and the presence or absence of water and ambient light. For example, particles suitable for use in catalysis applications are generally desired to be in the 0.5 to 5 nm range. Variations of the experimental parameters can easily produce monodisperse populations of particles anywhere within this range.

According to yet another embodiment, the nanoparticles described above are deposited on a support, for example, to produce a supported catalyst. According to one method of forming the supported catalyst, the colloidal suspension described above is slurried with a suitable carbon support such as Vulcan XC72R carbon black, Norit SX 1G activated carbon, Ketjen Acetylene black, etc. Oxide supports such as alumina, silica, titania, magnesia, or zinc oxide as well as non oxide supports such as carbides can also be used. The slurry is mixed at room temperature and the solvents are removed, for example through the use of a rotovap. Upon completion of the reaction, the resulting powder is allowed to dry. Experimental results showed that the powder is both active and selective in the as-prepared state, without need for any further pretreatment. Furthermore, while most Pd catalysts are typically alloyed with other metals to improve selectivity to ethylene ($C_2H_4$, the desired product) without further hydrogenating to ethane ($C_2H_6$) during the course of the reaction, as described in greater detail in the experimental section below, palladium catalysts formed using the presently described methods are substantially different in that they are able to fully convert acetylene while still maintaining a high selectivity to ethylene.

Accordingly, the present disclosure provides a fast and simple method for forming metal nanoparticles that produces very small, highly reactive, monodisperse populations of nanoparticles without the use of added capping agents or ligands that can hinder the use of the particles in certain fields such as catalysis.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "a host cell" includes a plurality (for example, a culture or population) of such host cells, and so forth.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

REFERENCES

[1] J. Park, C. Aliaga, J. Renzas, H. Lee, G. Somorjai, The role of organic capping layers of platinum nanoparticles in catalytic activity of co oxidation, Catal. Lett. 129 (2009) 1-6.
[2] T. Harada, S. Ikeda, M. Miyazaki, T. Sakata, H. Mori, M. Matsumura, A simple method for preparing highly active palladium catalysts loaded on various carbon supports for liquid-phase oxidation and hydrogenation reactions, J. Mol. Catal. A: Chem. 268 (2007) 59-64.
[3] H. Hirai, Formation and catalytic functionality of synthetic polymer-noble metal colloid, J. Macromol. Sci. Part A Pure Appl. Chem. 13 (1979) 633-649.
[4] K. Esumi, T. Itakura, K. Torigoe, Preparation of organo palladium sols from palladium complexes in various alcohols, Colloids Surf A 82 (1994) 111-113.
[5] J. S. Bradley, E. W. Hill, C. Klein, B. Chaudret, A. Duteil, Synthesis of monodispersed bimetallic palladium-copper nanoscale colloids, Chem. Mater. 5 (1993) 254-256.
[6] R. S. Underhill, G. Liu, Preparation and performance of pd particles encapsulated in block copolymer nanospheres as a hydrogenation catalyst, Chem. Mater. 12 (2000) 3633-3641.
[7] M. Brust, M. Walker, D. Bethell, D. J. Schiffrin, R. Whyman, Synthesis of thiolderivatised gold nanoparticles in a two-phase liquid-liquid system, J. Chem. Soc., Chem. Commun. 7 (1994) 801-802.
[8] O. C. Compton, F. E. Osterloh, Evolution of size and shape in the colloidal crystallization of gold nanoparticles, J. Am. Chem. Soc. 129 (2007) 7793-7798.
[9] A. Rodriguez, C. Amiens, B. Chaudret, M.-J. Casanove, P. Lecante, J. S. Bradley, Synthesis and isolation of cuboctahedral and icosahedral platinum nanoparticles. Liganddependent structures, Chem. Mater 8 (1996) 1978-1986.
[10] H. Hirai, N. Yakura, Protecting polymers in suspension of metal nanoparticles, Polym. Adv. Technol. 12 (2001) 724-733.
[11] T. Teranishi, M. Miyake, Size control of palladium nanoparticles and their crystal structures, Chem. Mater. 10 (1998) 594-600.
[12] J. S. Bradley, E. W. Hill, B. Chaudret, A. Duteil, Surface chemistry on colloidal metals. Reversible adsorbate-induced surface composition changes in colloidal palladium-copper alloys, Langmuir 11 (1995) 693-695.
[13] W. Tu, H. Liu, Rapid synthesis of nanoscale colloidal metal clusters by microwave irradiation, J. Mater. Chem. 10 (2000) 2207-2211.
[14] L. Kesavan, R. Tiruvalam, M. H. A. Rahim, M. I. bin Saiman, D. I. Enache, R. L. Jenkins, N. Dimitratos, J. A. Lopez-Sanchez, S. H. Taylor, D. W. Knight, C. J. Kiely, G. J. Hutchings, Solvent-free oxidation of primary carbon-hydrogen bonds in toluene using Au—Pd alloy nanoparticles, Science 331 (2011) 195-199.
[15] M. Mifsud, K. V. Parkhomenko, I. W. Arends, R. A. Sheldon, Pd nanoparticles as catalysts for green and sustainable oxidation of functionalized alcohols in aqueous media, Tetrahedron 66 (2010) 1040-1044.
[16] P. Burton, D. Lavenson, M. Johnson, D. Gorm, A. Karim, T. Conant, A. Datye, B. Hernandez-Sanchez, T. J. Boyle, Synthesis and activity of heterogeneous Pd/Al2O3 and Pd/ZnO catalysts prepared from colloidal palladium nanoparticles, Top. Catal. 49 (2008) 227-232.
[17] A. Gniewek, J. J. Ziólkowski, A. M. Trzeciak, M. Zawadzki, H. Grabowska, J. Wrzyszcz, Palladium nanoparticles supported on alumina-based oxides as heterogeneous catalysts of the Suzuki-Miyaura reaction, J. Catal. 254 (2008) 121-130.
[18] K. Esumi, T. Tano, K. Torigoe, K. Meguro, Preparation and characterization of bimetallic palladium-copper colloids by thermal decomposition of their acetate compounds in organic solvents, Chem. Mater. 2 (1990) 564-567.
[19] J. Athilakshmi, S. Ramanathan, D. K. Chand, Facile synthesis of palladium nanoclusters and their catalytic activity in sonogashira coupling reactions, Tetrahed. Lett. 49 (2008) 5286-5288.
[20] V. Ananikov, I. Beletskaya, Using nanosized, homogeneous, and heterogeneous catalytic systems in organic synthesis: changing the structure of active center in chemical reactions in solution, Nanotechnol. Russia 5 (2010) 1-17.
[21] X. Chen, G. Wu, J. Chen, X. Chen, Z. Xie, X. Wang, Synthesis of "clean" and well dispersive Pd nanoparticles with excellent electrocatalytic property on graphene oxide, J. Am. Chem. Soc. 133 (2011) 3693-3695.
[22] M. M. Johnson, D. W. Walker, G. P. Nowack, Selective Hydrogenation Catalyst, U.S. Pat. No. 4,404,124, Standard Oil Company, Chicago, Ill., 1983.
[23] F. Studt, F. Abild-Pedersen, T. Bligaard, R. Z. Sørensen, C. H. Christensen, J. K. Nørskov, Identification of non-precious metal alloy catalysts for selective hydrogenation of acetylene, Science 320 (2008) 1320-1322.
[24] J. Osswald, K. Kovnir, M. Armbruster, R. Giedigkeit, R. E. Jentoft, U. Wild, Y. Grin, R. Schlögl, Palladium-gallium intermetallic compounds for the selective hydrogenation of acetylene: part ii: surface characterization and catalytic performance, J. Catal. 258 (2008) 219-227.
[25] H. Molero, B. F. Bartlett, W. T. Tysoe, The hydrogenation of acetylene catalyzed by palladium: Hydrogen pressure dependence, J. Catal. 181 (1999) 49-56.
[26] W. G. Augustyn, R. I. McCrindle, N. J. Coville, The selective hydrogenation of acetylene on palladium-carbon nanostructured catalysts, Appl. Catal. A:General 388 (2010) 1-6.
[27] P. D. Burton, T. J. Boyle, A. K. Datye, Facile, surfactant-free synthesis of Pd nanoparticles for heterogenous catalyts, J. Catal. 280 (2011) 145-149.

EXAMPLES

Synthesis of Pd Nanoparticles for Heterogeneous Catalysis

Methods

Chemicals—All chemicals were used as received and stored under ambient conditions unless otherwise noted. Two separate containers of Pd(OAc)$_2$ were used, one stored and used in an argon-filled glovebox and the other stored and used under bench-top conditions. Anhydrous MeOH and bench-top MeOH, ethanol, 2-propanol, toluene, and acetone were reagent grade and purchased from Sigma Aldrich. Vulcan XC72R was obtained from Cabot Corporation. Hydrogen, nitrogen, and a mixture of 0.5% acetylene and 35% ethylene (balance nitrogen) were UHP grade from Matheson Trigas.

Synthesis

Preparation of colloidal nanoparticles—For a typical sample, Pd nanoparticles were synthesized by mixing Pd(OAc)$_2$ (5 mg) in MeOH (15 mL) in a scintillation vial and stirring for approximately 5 min with unobstructed exposure to room lighting. The vial was placed on an elevated stir plate for observation and allowed to react undisturbed for 20 min. After 20 min, a TEM grid was dipped into the vial and allowed to dry. Variations on this method were conducted with air-exposed precursors and solvents, including acetone, toluene, ethanol, and 2-propanol. The dependence upon light was evaluated by isolating a vial in an insulated container placed over a stir plate. The solution was stirred for 5 min in the dark and allowed to sit undisturbed over a 2 h period. Observations were conducted at 10 min intervals to minimize light exposure.

Preparation of supported catalyst—A supported catalyst was prepared by dissolving anhydrous Pd(OAc)$_2$ (20 mg) in anhydrous MeOH (30 mL) and stirring continuously for 10 min in a Schlenk flask under inert atmosphere. The flask was removed to ambient atmosphere and Vulcan XC72R carbon (1.0 g) was added. The slurry was mixed for an additional 10 min and subsequently attached to a rotovap, using the bath to maintain the flask at ambient temperature. The solvent was removed while the reaction continued to progress. After 30 min, the reaction was complete and the slightly damp powder was allowed to air dry prior to characterization. No additional treatments were performed prior to catalytic activity measurements. This sample will be referred throughout the application as Pd—NP/C. A similar sample was prepared under identical conditions, except toluene was used as the solvent. As this sample did not form nanoparticles in solution, it will be referred to simply as Pd/C.

Acetylene hydrogenation—The catalyst was granulated by pressing the dried powder under ~7 metric tons with a Carver hydraulic press to produce a pellet. The pellet was ground and the powder sieved to between 106 and 250 µm using #140 and #60 US standard testing sieves from VWR. A sample of 15 mg of powder was mixed with 400 mg SiC (350 µm average grain size, Washington Mills) as an inert to minimize temperature non-uniformity. The mixed powder was packed in a 0.25 in. quartz tube between two plugs of quartz wool. A mixture of acetylene (0.5%) and ethylene (35%) in a balance of nitrogen was passed over the powder at a flowrate of 66 mL/min. Hydrogen was passed at 1.4 mL/min to produce a 5:1 ratio of hydrogen to acetylene. Product gases were sampled at temperature intervals of 10° C. by a Varian 3800 gas chromatograph equipped with a CP-PoraBOND U column and an FID detector.

Characterization—FTIR (Nicolet 6700, 32 scans, 4 cm$^{-1}$ resolution) was used to probe for the presence of hydroxyl groups on each precursor. The prepared colloids were examined by transmission electron microscopy (TEM, JEOL 2010F) operated at 200 kV in scanning (STEM) and high-resolution (HRTEM) modes to determine the size and composition of the particles. X-ray diffraction (XRD, Panalytical X'Pert Pro, 45 kV 40 mA) was used as a complementary technique. An aliquot of the colloid was pipetted onto a zero-background Si wafer and allowed to dry at room temperature. As the solvent evaporated, the particles coalesced and produced a film, which was then analyzed to verify production of a metallic phase.

Results and Discussion

Figure 2:
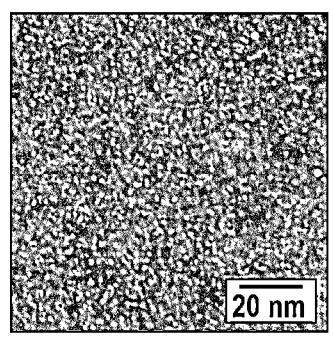
FIG. 2 is a STEM image of colloid deposited on carbon film.
Figure 3:
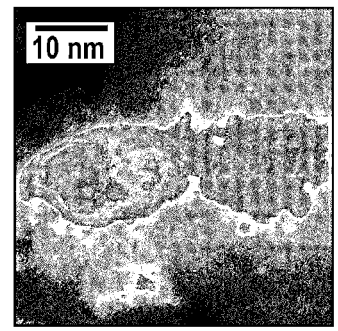
FIG. 3 is an image of Pd—NP/C before the reaction.
Figure 4:
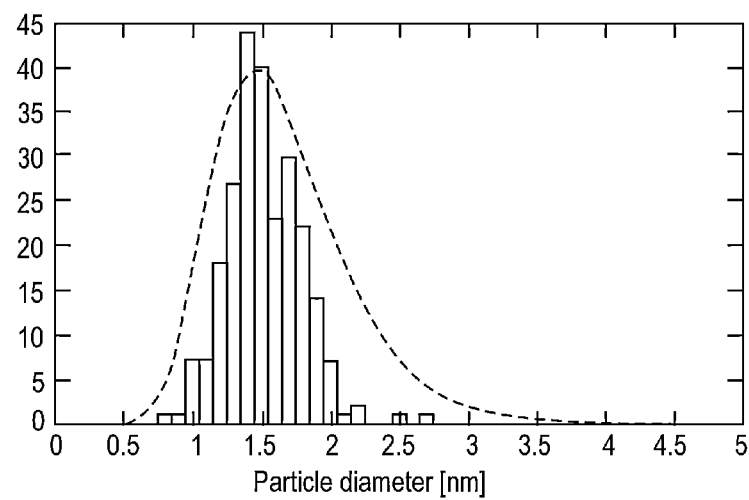
FIG. 4 is a graph of particle size distribution of Pd NP from MeOH.

The initial investigation involved the reduction of Pd(OAc)$_2$ in MeOH to produce a suspension of Pd NPs (FIGS. 1-4). A systematic study of precursor conditions, light exposure, and solvent was undertaken. In the initial study, using an air-exposed precursor and solvent, the dissolution of the red-orange Pd(OAc)$_2$ in MeOH yielded a pale yellow solution that progressively darkened to a black solution after 60 min (FIG. 1). Subsequent attempts to reproduce the reaction resulted in longer reaction times (up to days) and moderate variation in particle size. Under rigorously dry conditions, the color change was found to be both faster (dark green in 20 min, black in 30 min) and reproducible. A TEM grid was dipped into the solution at 20 min and a dark field STEM image is shown in FIG. 2. The mean diameter of 1.5 nm (FIG. 4) is remarkable in view of the simplicity of the preparation. Multiple tests were performed and it was found that the size distribution was very similar in each case. The Pd particles were so small that they were very difficult to detect via HRTEM on the carbon film and could only be imaged via dark field imaging in a STEM. Our estimate of precision in size measurement is based on the probe size used for our STEM imaging, 0.2 nm. The electron diffraction pattern is very diffuse in agreement with the small size and the low loading of the Pd NPs on the carbon film.

A sample of Pd(OAc)$_2$ in MeOH that was stored in a 'black box' was found to yield no color change after 2 h. Exposure to UV light only led to a similar reaction rate as the sample under ambient light. Larger chain alcohols (ethanol and 2-propanol) produced a color change in several hours, but non-alcohol solvents, such as acetone took one week to react. TEM samples prepared from the acetone preparation revealed that large Pd aggregates had formed. These observations indicated that alcohols were effective reducing agents, as noted by Hirai et al. [3]. Exposing a solution of Pd(OAc)$_2$ in anhydrous MeOH to ambient room light yielded optimal results.

Figure 5:
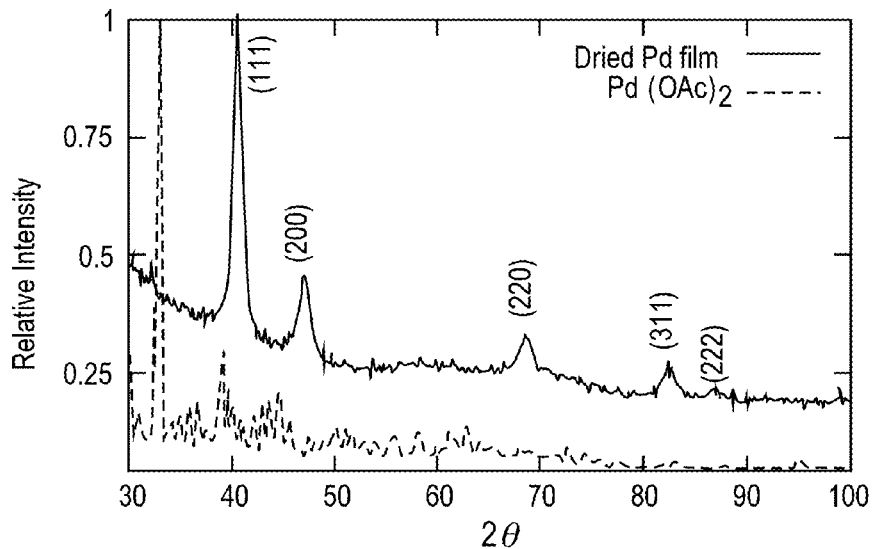
FIG. 5 is an XRD pattern of dried film colloid on a Si substrate that matches the reflections from fcc Pd. The precursor, $Pd(OAc)_2$, shows a very different pattern, indicating that the organic precursor was reduced to fcc metal during the synthesis.

Following these reaction conditions, a catalyst was prepared by mixing Vulcan XC72R carbon powder into the solution after 10 min of reaction. The suspension was stirred for an additional 10 min followed by drying in vacuo at room temperature. The powder was analyzed by TEM (FIG. 3) and the nanoparticles were found to be similar in size to those noted in the previous synthesis (FIG. 2). The Pd NPs in this colloid were confirmed to be metallic based on the XRD analysis of the dried colloid, which yielded the expected fcc Pd pattern. An XRD sample of the colloid was prepared by pipetting an aliquot of the suspension on a silicon wafer and allowing it to dry prior to analysis. As there were no surfactants, the metal dried to a thin film which produced peaks corresponding to metallic Pd. These peaks were indexed to ICCD card 89-4897 (fcc Pd) while the precursor did not display any metallic phase, shown in FIG. 5. The Pd—NP/C powder did not feature any prominent Pd peaks, which was expected due to the small crystallite size and low weight loading. EDS indicated that ~1 wt % loadings had been achieved.

Figure 6:
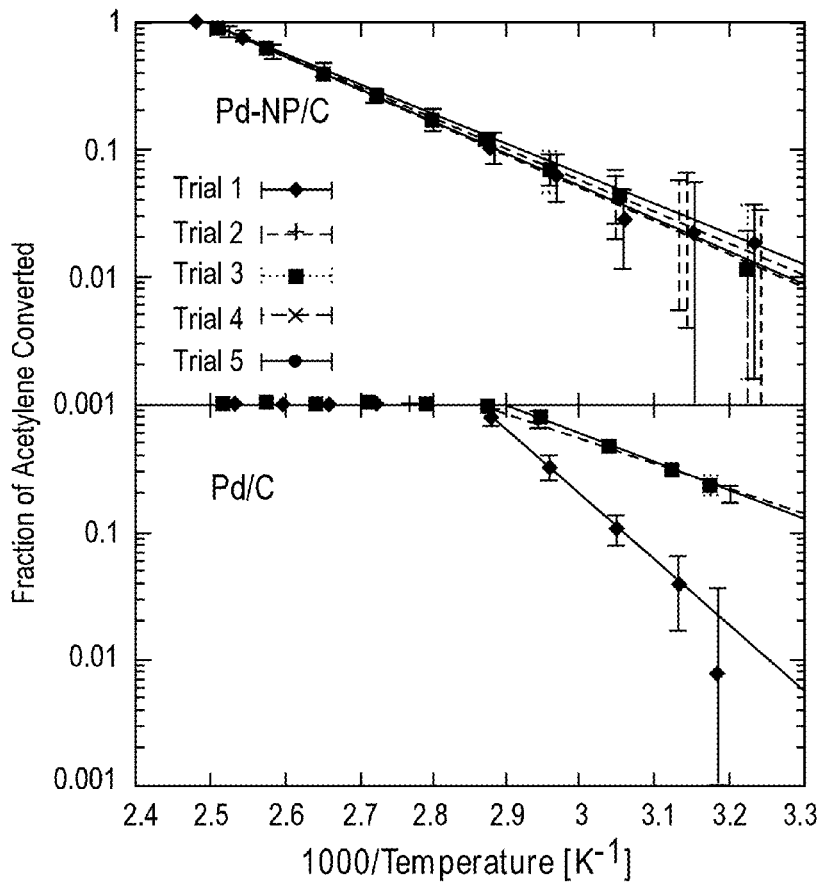
FIG. 6 is a graph of the fraction of acetylene converted over the reaction temperature range for Pd—NP/C (top graph) and Pd/C (bottom graph). Five repeat trials are shown for each catalyst.
Figure 7:
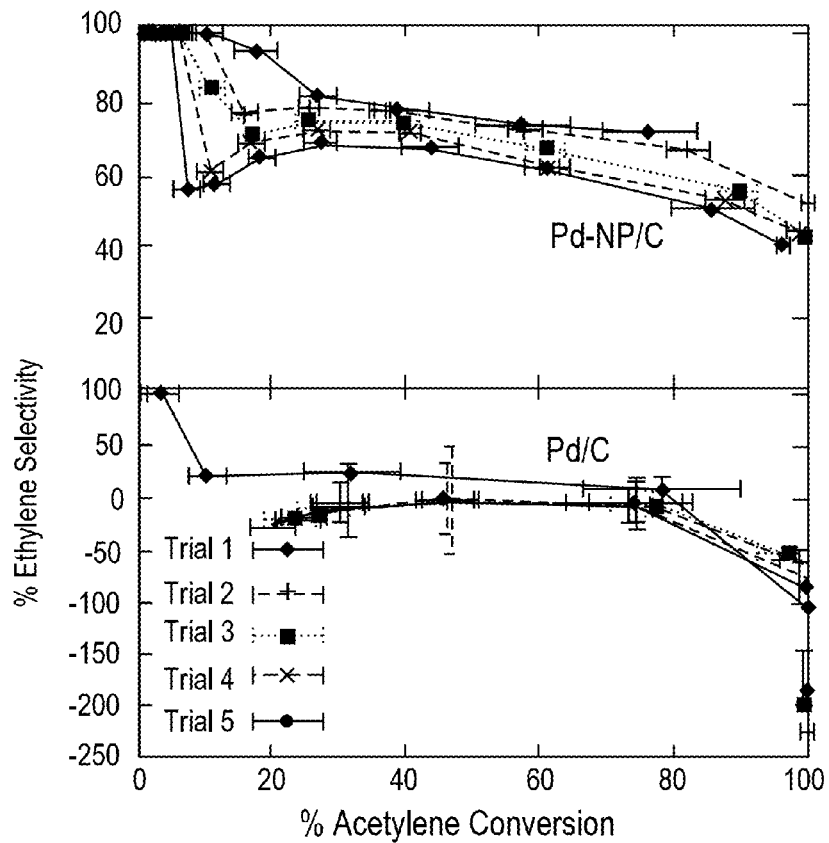
FIG. 7 is a graph of ethylene selectivity showing excess $C_2H_4$ production as positive selectivity (consumption as negative values). Five repeat trials are shown for both Pd—NP/C (top) and Pd/C (bottom).

Each as-prepared catalyst was subsequently tested for acetylene hydrogenation with a 70:1 mixture of ethylene to acetylene in a packed bed reactor. Interestingly, the Pd—NP/C catalyst was found to be selective (Eq. (1)) toward ethylene production at high conversion (FIG. 7) and active (FIG. 3, $E_a$=49 kJ/mol) without any pre-treatment. Four subsequent trials showed similar results (FIGS. 6 and 7, Table 1). The catalyst was therefore active without pre-treatment, and stable over the time interval studied. Pd is a well-known hydrogenation catalyst and is commonly diluted with other metals when used for selective hydrogenation of acetylene [22,23]. The Pd—NP/C catalyst yielded selectivity equivalent to the performance of the best catalyst reported in the literature, $Pd_3Ga_7$ [24]. The Pd/C catalyst exhibited an activation process where subsequent trials showed much greater activity in comparison with the initial experiment (FIG. 6, activation energies tabulated in Table 1). Each trial was significantly less selective (FIG. 7) at 100% conversion of acetylene. Both catalysts demonstrated activation energies within the reported values of 40-50 kJ/mol [25,23], except for trial 1 of Pd/C.

Selectivity was defined as the moles of ethylene generated per mole of acetylene consumed, as shown in Eq. (1). In the notation used, f denotes feed and e denotes effluent.

$$\text{Selectivity} = \frac{C_e^{Ethylene} - C_f^{Ethylene}}{C_f^{Acetylene} - C_e^{Acetylene}} \times 100\% \quad (1)$$

The change $\Delta C^{Ethylene}$ is caused by production of ethylene from acetylene hydrogenation and consumption to ethane. Therefore, a positive selectivity indicates a net gain in ethylene compared with the feed. A negative value represents a loss due to consumption of the feed ethylene in addition to total hydrogenation of acetylene to ethane. This definition of selectivity differs from an equation used by Osswald et al. [24] who consider the change in ethylene concentration $\Delta C^{Ethylene}$ to be unreliable, and use Eq. (2) instead.

$$\text{Selectivity} = \frac{C_f^{Acetylene} - C_e^{Acetylene}}{C_f^{Acetylene} - C_e^{Acetylene} + C_e^{Ethane} + 2C_e^{other}} \times 100\% \quad (2)$$

Figure 8:
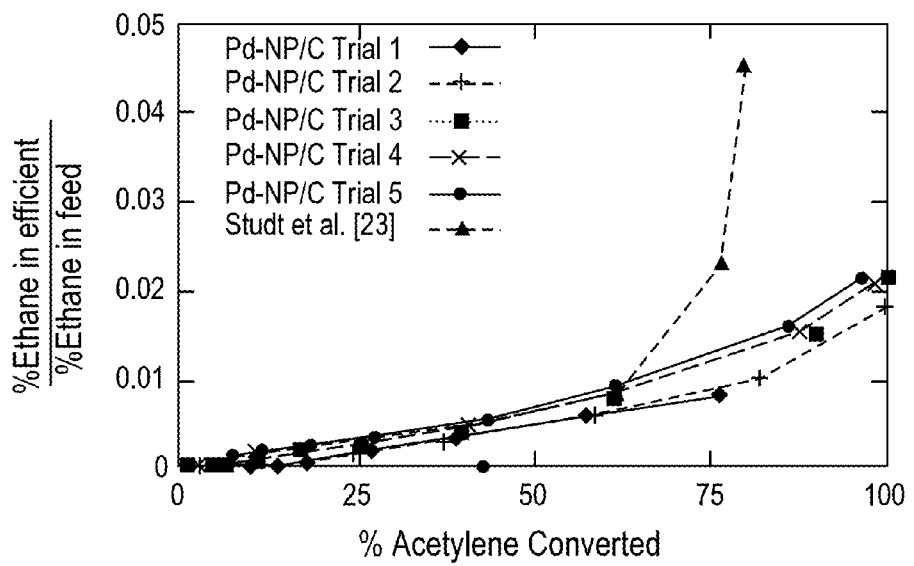
FIG. 8 is a graph of ethane content of outlet gas in the particles of the present disclosure normalized to inlet ethylene for comparison to prior art.

This alternate definition of selectivity was used to compare our results with those of Osswald et al. [24]. The term $C_e^{other}$ was omitted as there was no green oil detected in the present work. The comparison (Table 1) showed that the performance of Pd—NP/C was comparable with $Pd_3Ga_7$ and significantly better than $Pd/Al_2O_3$. Another study by Studt et al. [23] reported data in terms of ethane production, but using ~26× lower ethylene content in the feed. The ethane content of the present work is shown in FIG. 8 as moles of ethane in the effluent per mole of ethylene in the feed to compare the data on the same basis. Using this approach, it can be seen that the Pd—NP/C catalyst prepared in this work showed higher selectivity than the $Pd/MgAl_2O_4$ reported by Studt et al. [23]. The high selectivity of Pd—NP/C could be a result of the size of the nanoparticles, the carbon support, or possible carbonaceous species derived from the catalyst precursor and is under investigation. As the nanoparticles formed in solution, any carbonaceous impurities present could have deposited onto the particle as the sample dried. The presence of carbonaceous layers may have resulted in improved selectivity, as reported previously in the literature [26]. Additional details related to these experiments may be found, for example, in P. D. Burton, T. J. Boyle, A. K. Datye, Facile, surfactant-free synthesis of Pd nanoparticles for heterogenous catalytst, J. Catal. 280 (2011) 145-149, which is hereby incorporated by reference.

TABLE 1

Comparison of the Performance of the Pd catalysts using selectivity as defined by Eq. (2)

| Sample | $E_a$ kJ/mol | Conversion (%) | Selectivity (%) |
|---|---|---|---|
| Pd-NP/C | | | |
| Trial 1 | 49 | 76 | +72 |
| Trial 2 | 47 | 100 | +52 |
| Trial 3 | 47 | 100 | +43 |
| Trial 4 | 45 | 98 | +44 |
| Thal 5 | 42 | 96 | +40 |
| Pd/C | | | |
| Trial 1 | 98 | 100 | −105 |
| Trial 2 | 37 | 100 | −224 |
| Trial 3 | 39 | 100 | −203 |
| Trial 4 | 42 | 100 | −76 |
| Trial 5 | 42 | 100 | −89 |
| $Pd_3Ga_7$ [24] | | 99 | +71 |
| $Pd/Al_2O_3$ [24] | | 43 | +17 |

What is claimed is:

1. A method for forming palladium nanoparticles comprising:
    commencing a reaction by combining palladium acetate with an alcohol under ambient temperature conditions wherein no polymer is present in the reaction;
    allowing the reaction to progress until a black colloidal suspension is produced;
    allowing palladium nanoparticles in the colloidal suspension to precipitate; and
    collecting the palladium nanoparticles.

2. The method of claim 1 wherein the alcohol is methanol.

3. The method of claim 1 wherein the method takes place under ambient or UV light conditions.

4. The method of claim 1 wherein the step of combining the palladium acetate takes place in anhydrous conditions.

5. The method of claim 1 wherein the resulting nanoparticles have mean particle diameter of between 0.5 and 5 nm.

6. The method of claim 1 wherein the ambient temperature conditions are between 10° and 40° C.

7. The method of claim 1 wherein the ambient temperature conditions are between 15° and 35° C.

8. The method of claim 1 further comprising:
    introducing a support into the colloidal suspension so that the collected palladium nanoparticles are supported.

9. The method of claim 8 wherein the support comprises carbon, carbide, oxide, or nitride.

10. The method of claim 1 wherein no surfactant is present in the reaction.

11. The method of claim 10 wherein no capping ligand is present in the reaction.

12. The method of claim 10 wherein no capping ligand is present in the reaction.

13. The method of claim 1 wherein the collected palladium nanoparticles are catalytically active.

14. A method for forming palladium nanoparticles comprising:
    commencing a reaction by combining a palladium precursor with an alcohol under ambient temperature conditions wherein no polymer is present in the reaction;
    allowing the reaction to progress until a black colloidal suspension is produced;
    allowing palladium nanoparticles in the colloidal suspension to precipitate; and collecting the palladium nanoparticles; wherein the nanoparticles having a mean particle diameter of between 0.5 and 5 nm.

15. The method of claim 14 wherein the alcohol is methanol.

16. The method of claim 14 wherein the method takes place under ambient or UV light conditions.

17. The method of claim 14 wherein the step of dissolving the palladium precursor takes place in anhydrous conditions.

18. The method of claim 14 further comprising:
   introducing a support into the colloidal suspension so that the collected palladium nanoparticles are supported.

19. The method of claim 18 wherein the support comprises carbon, carbide, oxide, or nitride.

20. The method of claim 14 wherein the collected palladium nanoparticles are catalytically active.

\* \* \* \* \*